US009302323B2

(12) United States Patent
Christopherson, Jr.

(10) Patent No.: US 9,302,323 B2
(45) Date of Patent: Apr. 5, 2016

(54) POWDER METAL ULTRASONIC WELDING TOOL AND METHOD OF MANUFACTURE THEREOF

(71) Applicant: Federal-Mogul Corporation, Southfield, MI (US)

(72) Inventor: Denis Christopherson, Jr., Waupun, WI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/484,812

(22) Filed: Sep. 12, 2014

(65) Prior Publication Data

US 2014/0377118 A1 Dec. 25, 2014

Related U.S. Application Data

(60) Division of application No. 13/476,184, filed on May 21, 2012, now Pat. No. 8,834,595, which is a continuation of application No. 12/435,261, filed on May 4, 2009, now Pat. No. 8,196,797, which is a continuation-in-part of application No. 11/689,675, filed on Mar. 22, 2007, now Pat. No. 7,837,082.

(60) Provisional application No. 60/802,753, filed on May 23, 2006.

(51) Int. Cl.
| | |
|---|---|
| *B22F 3/26* | (2006.01) |
| *B22F 7/06* | (2006.01) |
| *B23K 20/10* | (2006.01) |
| *B23K 20/12* | (2006.01) |
| *C22C 1/10* | (2006.01) |
| *B22F 3/12* | (2006.01) |
| *B22F 5/00* | (2006.01) |
| *B29C 65/06* | (2006.01) |
| *B29C 65/08* | (2006.01) |
| *B29C 65/00* | (2006.01) |
| *B29K 101/12* | (2006.01) |
| *B29K 105/00* | (2006.01) |
| *B29K 705/00* | (2006.01) |

(Continued)

(52) U.S. Cl.
CPC ...... *B22F 7/06* (2013.01); *B22F 3/12* (2013.01); *B22F 3/26* (2013.01); *B22F 5/00* (2013.01); *B22F 7/062* (2013.01); *B23K 20/106* (2013.01); *B23K 20/1255* (2013.01); *B29C 66/81241* (2013.01); *B29C 66/81429* (2013.01); *C22C 1/1078* (2013.01); *B22F 2003/242* (2013.01); *B22F 2005/002* (2013.01); *B22F 2302/205* (2013.01); *B22F 2302/25* (2013.01); *B22F 2302/253* (2013.01); *B22F 2302/256* (2013.01); *B22F 2302/45* (2013.01); *B29C 65/0681* (2013.01); *B29C 65/08* (2013.01); *B29C 66/1142* (2013.01); *B29C 66/43* (2013.01); *B29C 66/80* (2013.01); *B29C 66/81264* (2013.01); *B29K 2101/12* (2013.01); *B29K 2105/251* (2013.01); *B29K 2705/00* (2013.01); *B29K 2995/007* (2013.01); *Y10T 428/12028* (2015.01)

(58) Field of Classification Search
None
See application file for complete search history.

(56) References Cited

U.S. PATENT DOCUMENTS

| | | | | |
|---|---|---|---|---|
| 3,426,951 | A | * | 2/1969 | Pohlman et al. ............... 228/1.1 |
| 3,711,341 | A | * | 1/1973 | Joshi et al. ...................... 419/23 |

(Continued)

*Primary Examiner* — George Wyszomierski
*Assistant Examiner* — Ngoclan T Mai
(74) *Attorney, Agent, or Firm* — Robert L. Stearns; Dickinson Wright, PLLC

(57) ABSTRACT

An ultrasonic welding tool fabricated of powder metal material includes a body and a welding tip extending axially from the body to a working end. The powder metal material can be ferrous-based and admixed with additives, such as alumina, carbide, ferro-molybdenum, ferro-nickel, chrome or tribaloy. An exposed surface of the welding tip can comprise $Fe_3O_4$ oxides. The tool is compacted to the desired shape and sintered. The body can include a different second material compacted separately from the welding tip and then joined to the tip and sintered.

7 Claims, 3 Drawing Sheets

(51) Int. Cl.
*B22F 3/24* (2006.01)

(56) References Cited

U.S. PATENT DOCUMENTS

| | | | | |
|---|---|---|---|---|
| 4,778,097 A | * | 10/1988 | Hauser | 228/44.7 |
| 5,931,368 A | * | 8/1999 | Hadar et al. | 228/4.5 |
| 6,523,732 B1 | * | 2/2003 | Popoola et al. | 228/1.1 |
| 6,973,723 B2 | * | 12/2005 | Cagney et al. | 29/888.047 |
| 7,264,146 B2 | * | 9/2007 | Takeuchi et al. | 228/1.1 |
| 7,754,141 B2 | * | 7/2010 | Stegelmann | 419/42 |
| 2005/0121493 A1 | * | 6/2005 | Mironescu et al. | 228/4.5 |
| 2005/0132842 A1 | * | 6/2005 | Kawata et al. | 75/231 |
| 2006/0024516 A1 | * | 2/2006 | Yoon et al. | 428/469 |

* cited by examiner

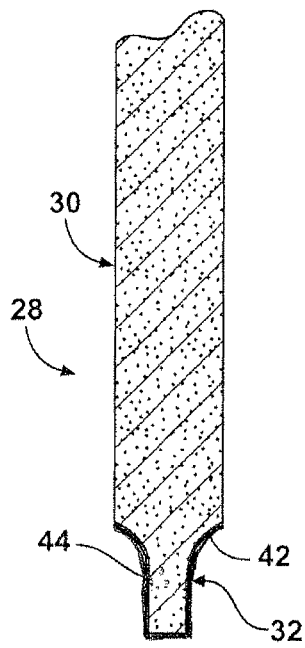
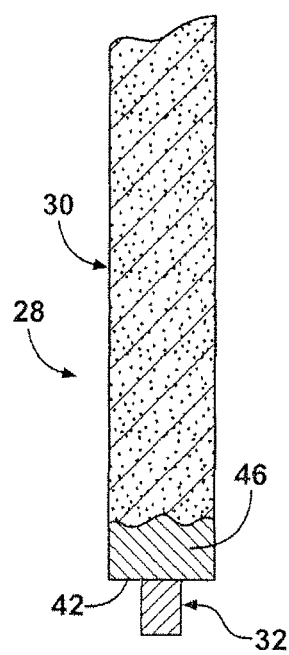
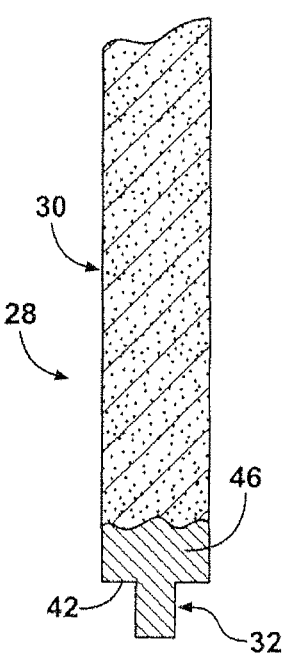
FIG. 4  FIG. 5  FIG. 6
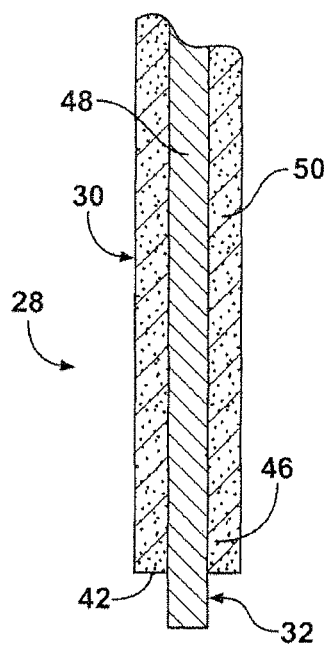
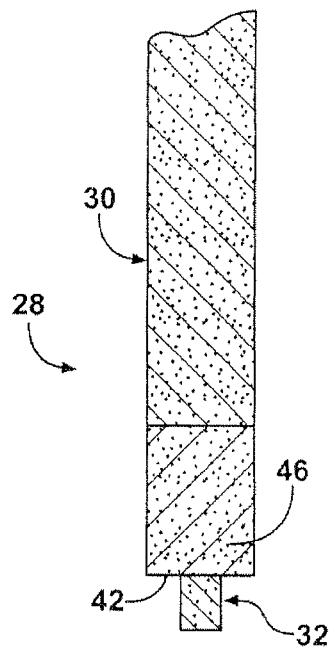
FIG. 7  FIG. 8

POWDER METAL ULTRASONIC WELDING TOOL AND METHOD OF MANUFACTURE THEREOF

CROSS-REFERENCE TO RELATED APPLICATION

This divisional application claims the benefit of U.S. Provisional Application Ser. No. 60/802,753, filed May 23, 2006, and U.S. Utility application Ser. No. 11/689,675, filed Mar. 22, 2007, now U.S. Pat. No. 7,837,082, and U.S. C-I-P application Ser. No. 12/435,261, filed May 4, 2009, now U.S. Pat. No. 8,196,797, and U.S. Continuation application Ser. No. 13/476,184, filed May 21, 2012, now U.S. Pat. No. 8,834,595, which are incorporated herein by reference in their entirety.

BACKGROUND OF THE INVENTION

1. Technical Field

This invention relates generally to ultrasonic welding tools, and more particularly to the materials and process used to make such tools.

2. Related Art

Ultrasonic welding is a technique used to join parts or workpieces comprising hard and soft plastics, and metals. In ultrasonic welding of thermoplastics, vibratory energy is applied to the plastic workpieces by an ultrasonic welding tool, causing local melting of the plastic. The vibrations are transferred through the plastic workpieces to the joint to be welded. The tool can remain in a single location on one of the workpieces to be welded and the ultrasonic energy will travel through the plastic workpieces and weld the entire joint.

Ultrasonic welding can also be used to join metals, preferably dissimilar metals. The vibrations travel through the metal workpieces and the welding occurs due to local motion of the metal material and high-pressure dispersion of surface oxides. The high frequency vibrations cause some heating of the metals, but not enough to melt the metals.

Ultrasonic welding can also be used to enhance the soldering process. Ultrasonic soldering includes introducing the high frequency vibrations into molten solder and introducing a cavitation action at the welding tip, which disrupts and disperses the surface oxides. The disruption of the surface oxides permits the solder to wet the metal workpiece so that a solidified solder is formed behind the tool.

Ultrasonic welding is a preferred method of joining small workpieces which are too delicate for traditional welding techniques, such as wires and delicate circuits. Ultrasonic welding is widely used in the packaging industry, especially for foods and medical supplies. Further, ultrasonic welding is quicker than traditional welding systems, and it does not require a ventilation system to remove heat or exhaust, which are often needed in other welding systems.

An ultrasonic welding system typically includes a power supply delivering a high power AC signal to a converter, which converts the AC signal into a mechanical vibration. As indicated above, the ultrasonic welding tool, also known as a sonotrode or horn, applies the high frequency vibrations to the workpieces to be welded. A booster can be used to modify the amplitude of the vibration. The converter, booster, and tool are specifically tuned to resonate at the same ultrasonic frequency, which typically ranges from 15 kHz to 70 kHz. The workpieces to be welded are held in a press under pressure to prevent the workpieces from being forced apart as the tool applies the mechanical vibrations.

Although ultrasonic welding has numerous advantages, the technique has limited use due inadequacies of the tool. Existing ultrasonic welding tools are typically wrought or cast from a metal alloy. Upon forming the basic structure of the tool, it must be machined to achieve desired features and shape, which is costly and complex. The manufacturing and finishing processes limit the selection of material available for use as an ultrasonic welding tool. Further, the available materials are not compatible with the workpieces to be joined, thus further limiting the use of ultrasonic welding as a method of welding workpieces.

SUMMARY OF THE INVENTION AND ADVANTAGES

The ultrasonic welding tool includes a welding tip fabricated of powder metal material for applying a high frequency vibration to at least two workpieces to be welded. The tool is compatible with a wide range of metallic workpiece materials.

A method of fabricating the ultrasonic welding tool includes compacting a powder metal material and sintering the powder metal material at about ambient pressure which is not under a vacuum. The method can alternatively include compacting a first powder material to form a welding tip and compacting a second powder material to form a body of the ultrasonic welding tool separately from the welding tip. The welding tip and the body are joined and sintered.

The use of a powder metal material allows a great range of materials to be used in the tool. For example, the invention contemplates the use of metal alloys, blends and admixtures of metals, high wear composite materials, and high friction composite materials such as cermets. Further, powder metal material comprises an inherently porous structure so that additives can be used in the powder metal mix to adjust the strength and other physical characteristics. The powder metal material can also be treated to adjust the physical characteristics of the tool. The powder metal mixture, additives, and treatments can be selected to best suit the workpieces to be welded, so that the tool is compatible with more workpieces to be welded. Further, the mixture, additives, and treatments can be adjusted to meet cost restraints.

The powder metallurgy process will enable the formation of a gradient structure in either materials and/or properties of the tool. For example, the welding tip can comprise a very hard and more costly powder metal composition, while the body can comprise a lower-cost material. The powder metallurgy process enables the tool be made near net shape without extensive post fabrication machining or finishing operations. Further, different portions of the tool can be formed independent of one another so that they can be selectively designed to achieve desired physical characteristics and then subsequently joined to one another during sintering.

BRIEF DESCRIPTION OF THE DRAWINGS

These and other advantages and features of the present invention will become more readily appreciated when considered in connection with the following detailed description and drawings, in which:

FIGS. 4 through 8 are cross-sectional views illustrating different embodiments of ultrasonic welding tools constructed according to the present invention.

DETAILED DESCRIPTION OF THE INVENTION

Figure 1:
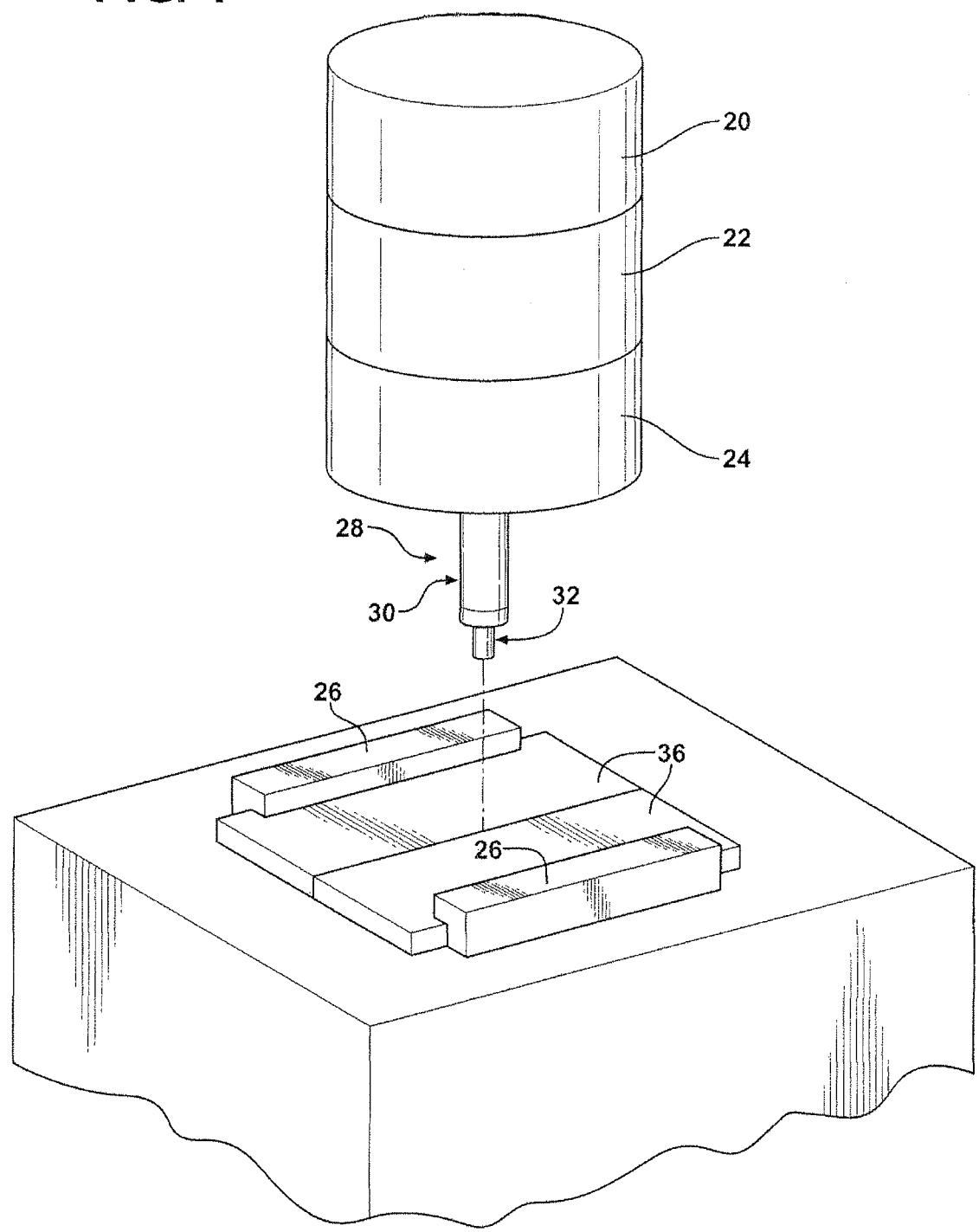
FIG. 1 is a schematic perspective view illustrating the components of an ultrasonic welding system.

FIG. 1 illustrates a typically ultrasonic welding system including a power supply 20, converter 22, booster 24, press 26, and an ultrasonic welding tool 28 according to the invention. The ultrasonic welding tool is generally shown at 28 and comprises a body 30 and a welding tip 32 or probe extending axially from the body 30 to a working end 34 for applying a high frequency vibration to a workpiece 36 to be welded. The working end 34 includes a face 38 serving as the functional surface in contact with a workpiece 36 to effect the formation of an ultrasonic weld between two workpieces 36.

Figure 2:
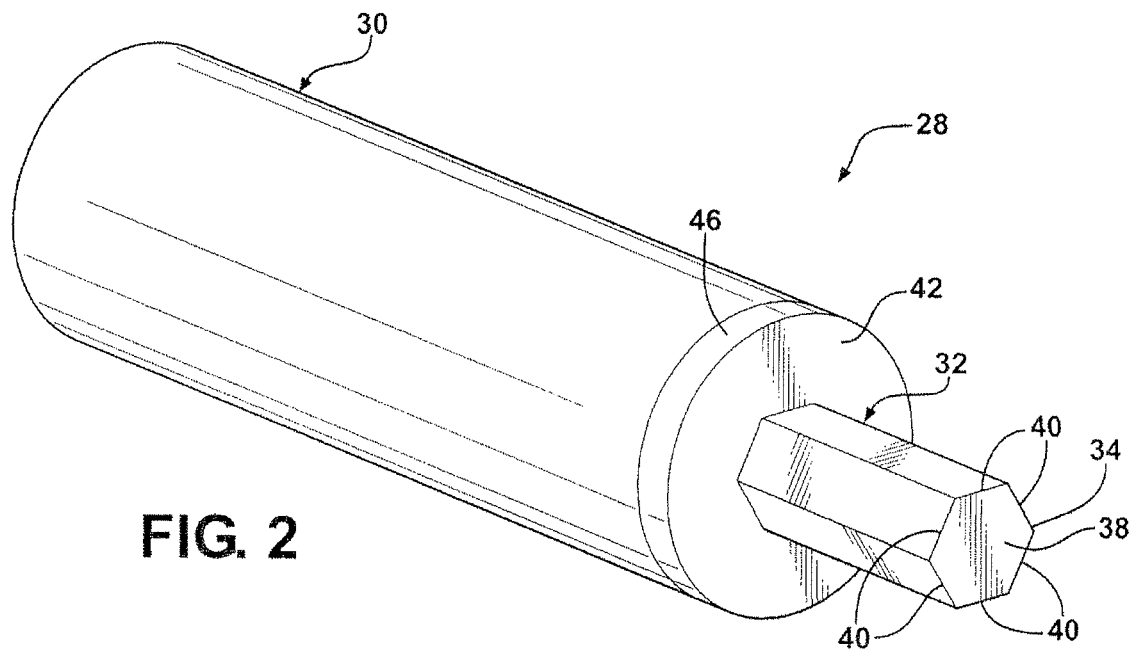
FIG. 2 is an enlarged fragmentary perspective view of a welding tip of an ultrasonic welding tool.
Figure 3:
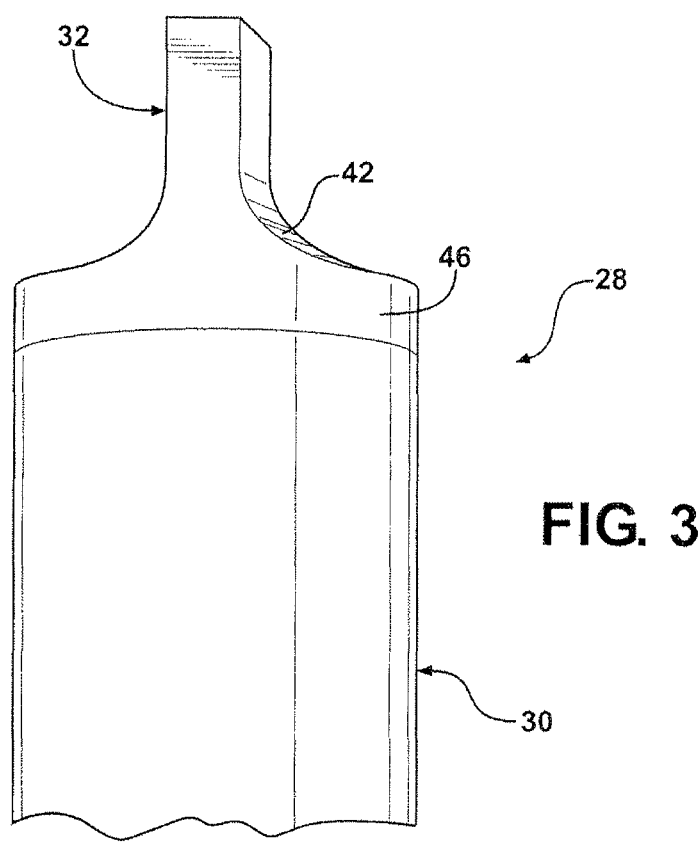
FIG. 3 is a further enlarged fragmentary perspective view of a welding tip end of an ultrasonic welding tool.

The ultrasonic welding tool 28 can take on any of a number of shapes and features. FIG. 2 illustrates one embodiment of the tool 28 wherein the body is generally cylindrical, and the welding tip 32 can be provided with flats 40. The present invention is not limited to any particular shape and/or size of the welding tip 32, nor are there limits to the number and shape of various surfaces of the welding tip 32. Further, the body 30 can present a shoulder region 46 providing a shoulder surface 42 from which the welding tip 32 extends, as shown in FIGS. 1-8. The shoulder region 46 is not limited to any particular size and/or shape, for example the shoulder surface 42 can have an angled, cupped, or concave configuration. FIGS. 3 and 4 illustrate another embodiment of the tool 28 wherein the shoulder surface 42 comprises a contoured profiled extending into the welding tip 32. The overall configuration of the ultrasonic welding tool 28 is not limited to the disclosed embodiments, which are meant to be exemplary, and contemplates any ultrasonic welding tool 28 configuration suitable for ultrasonic welding that may be presently available or developed in the future.

Turning now to particular aspects contemplated by the present invention, at least the welding tip 32 of the ultrasonic welding tool 28 is fabricated of a powder metal material which has been compacted and sintered to the desired shape. One advantage of powder metallurgy is that it enables the ultrasonic welding tool 28 to be made near net shape to the desired final tool 28 configuration without extensive post fabrication machining or secondary finishing operations of the tool 28. Another advantage is that it enables a wide selection of materials that might not otherwise be available for use in connection with wrought ultrasonic welding tools.

In one example of FIG. 4, the entire ultrasonic welding tool 28 is fabricated of the same powder metal material. For example, the tool 28 may be fabricated of an iron based pre-alloyed powder metal material, such as M2 or H13 tool steels. These materials are compacted and then sintered to near net shape and may be used with little post-forming finishing of the tools.

Powder metal material is advantageous in connection with ultrasonic welding tools 28 in that the inherent porous structure of the material increases the friction coefficient as compared to a wrought material. The use of powder metal also reduces the thermal conductivity as compared to wrought tools. This acts to maintain more heat at the tool 28 and workpiece 36 interface since the powder metal tool 28 has less of a heat sink effect than that of a wrought tool counterpart. The base material may further be treated or altered to vary the properties, including altering the coefficient of friction and/or the wear resistance. For example, as shown in FIG. 4, an exposed surface 44 of the welding tip 32 may be steam treated under high temperature and pressure to effectively oxidize and convert the exposed surface 44 of the welding tip 32 to $Fe_3O_4$, which is a highly stable form of iron oxide, that has the effect of increasing the wear resistance and friction coefficient of the iron-based powder metal material.

Friction-altering powder additives can be admixed with the powder metal mix to improve the working properties of the tool 28. The additives may increase or decrease the kinetic coefficient of friction of the ultrasonic welding tool 28 to respectively increase or decrease the heat generated during use of the ultrasonic welding tool 28. Accordingly, the tool 28 can be selectively manufactured to generate the desired amount of heat in use, thereby reducing workpiece-to-tool adhesion, while providing the desired weld properties, depending on the material properties of the workpieces 36 be joined. The additives can be added to the powder metal mix prior to compaction, and then pressed and sintered in-situ. For example, additions $CaF_2$, $MnS$, $MoS_2$, $BN$, $CaCO_3$, silica, alumina, ceramic, carbide compounds, and other hard, stable particles, such as ferro-molybdenum, ferro-nickel, chromium and/or tribaloy, may be added to improve the working performance of the base powder metal material. The invention is not limited to any particular composition of material and, within its scope, is directed to the broad concept of using powder metallurgy to form ultrasonic welding tools 28 without regard to any particular composition.

Post sinter processing may also include resin impregnation or other impregnation material to fill the porosity of at least certain portions of the tool 28 to enhance the working performance of the tool 28. The impregnation can include various materials which, as mentioned, will alter the kinetic coefficient of friction of the tool 28, the thermal conductivity, and working performance of the tool 28. This includes the infiltration of a material having a lower melting point than the base powder metal mix to fill the porosity of the powder metal material. One common infiltration technique uses Copper base alloys.

The use of powder metallurgy also enables the maker of the tool 28 to alter the properties, as desired, in different regions of the tool 28. This can be done via the sintering process alone and/or through the use of mixtures of various powders, alloys, and additives to provide a hybrid of microstructures including a variety of microstructural phase gradients throughout the tool 28. For example, a combination of hard phase, soft phase and carbide precipitates in the microstructure may provide strength, ductility and wear resistance properties not available in a single phase structure. The various phases and features may include ferrite, pearlite, bainite, martensite, metal carbides, hypereutectoid and hypoeutectoid phases and various precipitates, for example.

In addition, sintering aid additives, which are added to the powder metal mix prior to compaction, can be used to facilitate manufacture of the tool 28. The sintering aid additives can improve the strength and other properties of the tool 28, such as wear resistance, and thermal properties, for example, through liquid phase, transient liquid phase or enhanced solid solution mechanisms. Some examples of sintering aid materials include, by way of example and without limitation, $MoS_2$, phosphorous and phosphorous compounds, boron, cobalt, tin, and other materials that improve the degree of sinter and/or density of the compacted region of the tool 28.

As mentioned, different process treatments can be used on selected regions of the ultrasonic welding tool 28, thereby altering the composition of the material in different regions. Accordingly, as shown in FIG. 5, for example, the welding tip 32 is made of one material which may have properties of extremely good wear resistance and high hardness in order to best function and withstand the pressures and temperatures associated with the welding tip 32 as it contacts and applies the high frequency vibrations to the workpieces 36 to be welded, and the body 30 can be made of a different second material if desired which may constitute a lower alloy, less expensive material. Further, the shoulder region 46 can be fabricated of yet another different material exhibiting good wear resistance but also exhibiting a high friction coefficient to maximize the welding capabilities of the tool 28 during ultrasonic welding.

FIG. 6 is a variation on FIG. 5 in which the welding tip 32 and shoulder region 46 of the tool 28 are fabricated of one powder metal material, whereas the remaining portions of the body 30 are fabricated of a second powder metal composition. Of course, the welding tip 32 could be fabricated of powder metal to achieve the advantages described herein which may be cemented or otherwise joined to a body 30 made of a different second material, which may not necessarily be a powder metal, in order to reduce costs or offer an alternative to an all-powder metal ultrasonic tool 28 if desired.

FIG. 7 illustrates another gradient powder metal structure of the ultrasonic welding tool 28, in which a core 48 of the tool 28 may be fabricated of one material, such as a high load, high wear resistance material, and an outer layer 50 or sheath of the tool 28, is fabricated of a second material which may be a wear resistant, but higher coefficient of friction material than that used for the core 48.

Finally, FIG. 8 illustrates another friction stir welding tool 28, in which various portions of the tool 28 are constructed separately from one another, and thereafter sinter bonded to one another. As such, the welding tip 32 can be compacted from one powder mixture, the shoulder region 46 from another powder mixture, and the remaining portions of the body 30 from yet another powder mixture. Thereafter, the separate portions are sintered together. Sintering additives or other additives can also be incorporated in one or more of the powder mixtures of the respective portions, as desired. It should be recognized that the number of portions constructed separately from one another can be varied, as necessary, to obtain the tool 28 structure desired.

Another aspect of the invention includes a method of manufacturing a tool 28 in accordance with the embodiments above. The method includes compacting a powder metal material and sintering the powder metal material at or about ambient pressure which is not under a vacuum or in a closed chamber pressure vessel. This method is used to form the welding tip 32 of the tool 28 having the working end 34. The method can include forming the other portions of the respective tool 28, and joining the portions to one another. One aspect of the manufacturing process contemplates that the sintering can be conducted in a continuous-style furnace at temperatures above 900 degrees C.

Where adjacent ones of the respective portions, and, including their various embodiments, are compacted from powder, the method further includes joining the separate portions to one another by a diffusion process within a sintering furnace. Sintering enhancement additives or other techniques can be used in the sintering process. It should be recognized that various combinations of the aforementioned body 30, shoulder region 46, and welding tip 32 may be constructed as one piece or separately from one another, and joined together via the sintering process.

It is to be understood that other embodiments of the invention which accomplish the same function are incorporated herein within the scope of any ultimately allowed patent claims.

The invention claimed is:

1. A method of manufacturing an ultrasonic welding tool comprising a powder metal material including the steps of:
   compacting a ferrous-based powder metal material to form a welding tip;
   sintering the powder metal material at about ambient pressure which is not under a vacuum; and
   forming $Fe_3O_4$ in the welding tip.

2. A method as set forth in claim 1 wherein said sintering is further defined as sintering in a continuous-style furnace.

3. A method as set forth in claim 1 further comprising including at least one additive in the powder metal material, wherein the at least one additive is selected from the group consisting of $CaF_2$, MnS, $MoS_2$, BN, $CaCO_3$, $SiO_2$, $Al_2O_3$, ferro-nickel, and an alloy of Cr, Ni, and Co.

4. A method as set forth in claim 1 wherein the step of forming the $Fe_3O_4$ comprises steam treating the powder material to oxidize and convert an exposed surface of the ultrasonic welding tool to $Fe_3O_4$.

5. A method as set forth in claim 1 further comprising impregnating a resin in pores of the powder metal material.

6. A method as set forth in claim 1 further comprising infiltrating copper in pores of the powder metal material.

7. A method as set forth in claim 1 further comprising: compacting a second material to form a body of the ultrasonic welding tool separately from the welding tip; and joining and sintering the welding tip and the body.

* * * * *